United States Patent Office 3,777,026
Patented Dec. 4, 1973

3,777,026
N-SUBSTITUTED AMINO-N-NITROSO-AMINO-ACETONITRILES AS ANTI-ANGINAL AGENTS
Paul L. Anderson, Dover, N.J., assignor to Sandoz-Wander, Inc., Hanover, N.J.
No Drawing. Continuation-in-part of application Ser. No. 113,622, Feb. 8, 1971, which is a continuation-in-part of application Ser. No. 44,654, June 8, 1970, both now abandoned. This application June 14, 1972, Ser. No. 262,473
Int. Cl. A61k 27/00
U.S. Cl. 424—248      6 Claims

ABSTRACT OF THE DISCLOSURE

Certain known N-substituted amino-N-nitroso-aminoacetonitriles, e.g., N - morpholino-N-nitroso-aminoacetonitrile, have been found to be useful as anti-anginal agents.

---

This is a continuation-in-part of copending application Ser. No. 113,622, filed Feb. 8, 1971, now abandoned which in turn is a continuation-in-part of copending application Ser. No. 44,654, filed June 8, 1970, now abandoned.

This invention relates to N-nitroso-aminoacetonitrile derivatives. More particularly, this invention concerns the use of N - substituted amino-N-nitroso-aminoacetonitriles as anti-anginal agents and to pharmaceutical compositions containing the above compounds as an active ingredient thereof.

The active agents with which this invention is concerned may be represented by the following structural formula

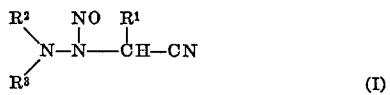

(I)

where $R^1$ represents hydrogen, alkyl or

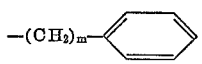

where $m$ is 0, 1 or 2; and $R_2$ and $R_3$ each, independently, represent lower alkyl, i.e., alkyl having 1 to 4 carbon atoms, e.g., methyl, ethyl, n-propyl and the like; lower alkenyl, i.e., alkenyl having 3 to 5 carbon atoms, e.g., allyl, and the like; lower alkynyl, i.e., alkynyl having 3 to 5 carbon atoms; e.g., propargyl and the like; ω-hydroxyloweralkyl, i.e., ω-hydroxyloweralkyl having 2 to 4 carbon atoms, e.g., β-hydroxyethyl and the like; cycloalkyl having 3 to 8 carbon atoms, e.g., cyclohexyl and the like;

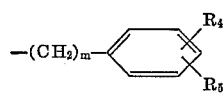

where $m$ is as defined above; and $R^4$ and $R^5$ each, independently, represent hydrogen; hydroxy; halo having an atomic weight of about 19 to 36; cyano trifluoromethyl; lower alkyl as defined above; lower alkoxy i.e., alkoxy having 1 to 4 carbon atoms, e.g., methoxy, ethoxy, and the like; alkanoyloxy having 2 to 4 carbon atoms, e.g., acetoxy and the like; alkanoyl having 2 to 4 carbon atoms, e.g., acetyl and the like; ω-hydroxylower alkyl, i.e., ω-hydroxy-lower alkyl having 2 to 4 carbon atoms, e.g., β-hydroxyethyl and the like; di-lower alkyl amino, i.e., di-lower alkyl amino wherein the lower alkyl is as defined above, e.g., dimethylamino, diethylamino and the like; or $R^4$ and $R^5$ together on adjacent atoms may be —CH$_2$OCH$_2$— or —OCH$_2$O—; or $R^2$ and $R^3$ together with N represent

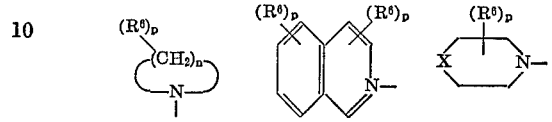

where $n$ is 4, 5 or 6; $p$ is 0, 1 or 2; X represents —O— or $R^7N<$ where $R^7$ is hydrogen; lower alkyl as defined above; alkanoyl having 2 to 4 carbon atoms; ω-hydroxy lower alkyl as defined above; alkoxyalkyl having 2 to 4 carbon atoms, e.g., methoxyethyl and the like; lower alkyl having 1 to 4 carbon atoms substituted with 1 to 4 halogen atoms having an atomic weight between 19 to 36, e.g., trifluoromethyl and the like or

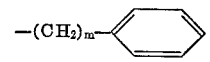

where $m$ is as defined above; and $R^6$ represents hydroxy; halo as defined above; lower alkyl, as defined above; lower alkoxy, as defined above, alkanoyl having 2 to 4 carbon atoms; alkanoyloxy having 2 to 4 carbon atoms; ω-hydroxy lower alkyl, as defined above, alkoxyalkyl having 2 to 4 carbon atoms, e.g., methoxyethyl and the like; lower alkyl having 1 to 4 carbon atoms substituted with 1 to 4 halogens having an atomic weight between about 19 to 36, e.g., trifluoromethyl, α,β-dichloroethyl and the like; or

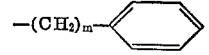

where $m$ is as defined above, provided that when $R^4$ and $R^5$ are both trifluoromethyl or when more than one of $R^6$ is trifluoromethyl on a phenyl ring, they are on other than adjacent carbon atoms, and pharmaceutically acceptable salts of those compounds where X is $R^7N<$.

The compounds of Formula I are known and may be prepared according to methods disclosed in the literature from known materials. The present invention contemplates only the novel use of such compounds, particularly as anti-anginal agents. The preferred compound for this use is N-morpholino-N-nitroso-aminoacetonitrile.

Other N - disubstituted amino-N-nitroso-aminoacetonitriles which can be used in the treatment of angina pectoris include N-diallylamino-N-nitroso-aminoacetonitrile
N-dimethylamino-N-nitroso-aminoacetonitrile
N-diallylamino-N-nitroso-α-phenethyl-aminoacetonitrile
N-diallylamino-N-nitroso-α-methyl-aminoacetonitrile
N-methylpropargylamino-N-nitroso-aminoacetonitrile
N-(N-allyl-β-hydroxyethylamino)-N-nitroso-amino-acetonitrile
N-methylcyclohexylamino-N-nitroso-aminoacetonitrile
N-methylphenylamino-N-nitroso-aminoacetonitrile
N-methylphenylethylamino-N-nitroso-aminoacetonitrile
N-dibenzylamino-N-nitroso-aminoacetonitrile N-(N-methyl-p-hydroxyphenylamino)-N-nitroso-aminoacetonitrile
N-(N-propyl-p-chlorophenylamino)-N-nitroso-aminoacetonitrile
N-(N-methyl-p-cyanophenylamino)-N-nitroso-α-phenyl-aminoacetonitrile
N-(N-ethyl-o-trifluoromethylphenylamino)-N-nitroso-aminoacetonitrile
N-(N-methyl-o-methoxyphenylamino)-N-nitroso-aminoacetonitrile
N-(N-methyl-o-toluidino)-N-nitroso-aminoacetonitrile
N-(N-methyl-p-acetoxyphenylamino)-N-nitroso-aminoacetonitrile
N-(N-methyl-p-acetylphenylamino)-N-nitroso-aminoacetonitrile
N-(N-methyl-o-[β-hydroxyethyl]phenylamino)-N-nitroso-aminoacetonitrile
N-(N-methyl-p-dimethylaminophenylamino)-N-nitroso-aminoacetonitrile
N-(N-methyl-3,4-dimethyleneoxyphenylamino)-N-nitroso-aminoacetonitrile or
N-(N-methyl-3,4-methylenedioxybenzylamino)-N-nitroso-aminoacetonitrile.

The N-heterocyclic substituted - N - nitroso-aminoacetonitriles contemplated as active agents in the compositions of this invention include N-piperidino-N-nitroso-aminoacetonitrile
N-piperidino-N-nitroso-α-methyl-aminoacetonitrile
N-hexamethyleneimino-N-nitroso-aminoacetonitrile
N-(4-hydroxypiperidino)-N-nitroso-aminoacetonitrile
N-(2,4-dichloropiperidino)-N-nitroso-aminoacetonitrile
N-(4-methylpiperidino)-N-nitroso-aminoacetonitrile
N-(4-methoxypiperidino)N-nitroso-aminoacetonitrile
N-(4-acetylpiperidino)-N-nitroso-aminoacetonitrile
N-(4-acetoxypiperidino)-N-nitroso-aminoacetonitrile
N-(4-[β-hydroxyethyl]-piperidino)-N-nitroso-aminoacetonitrile
N-(4-methoxyethylpiperidino)-N-nitroso-aminoacetonitrile
N-(4-trifluoromethylpiperidino)-N-nitroso-aminoacetonitrile
N-(2-benzylpiperidino)-N-nitroso-aminoacetonitrile
N-(2-phenylpiperidino)-N-nitroso-aminoacetonitrile
N-isoquinolino-N-nitroso-aminoacetonitrile
N-[1-hydroxyisoquinolino]-N-nitroso-aminoacetonitrile
N-[1-chloroisoquinolino]-N-nitroso-aminoacetonitrile
N-[1-methylisoquinolino]-N-nitroso-aminoacetonitrile
N-[1-methoxyisoquinolino]-N-nitroso-aminoacetonitrile
N-[1-acetylisoquinolino]-N-nitroso-aminoacetonitrile
N-[1-acetoxyisoquinolino]-N-nitroso-aminoacetonitrile
N-[1-β-hydroxyethylisoquinolino]-N-nitroso-aminoacetonitrile
N-[1-methoxyethylisoquinolino]-N-nitroso-aminoacetonitrile
N-[4-trifluoromethylisoquinolino]-N-nitroso-aminoacetonitrile
N-[1-benzylisoquinolino]-N-nitroso-aminoacetonitrile
N-(2-hydroxymorpholino)-N-nitroso-aminoacetonitrile
N-(2-chloromorpholino)-N-nitroso-aminoacetonitrile
N-(2-methylmorpholino)-N-nitroso-aminoacetonitrile
N-(2-methoxymorpholino)-N-nitroso-aminoacetonitrile
N-(2-acetylmorpholino)-N-nitroso-aminoacetonitrile
N-(2-acetoxymorpholino)-N-nitroso-aminoacetonitrile
N-(3-β-hdyroxyethylmorpholino)-N-nitroso-aminoacetonitrile
N-(3-methoxyethylmorpholino)-N-nitroso-aminoacetonitrile
N-(3-trifluoromethylmorpholino)-N-nitroso-aminoacetonitrile
N-(3-benzylmorpholino)-N-nitroso-aminoacetonitrile
N-piperazino-N-nitroso-aminoacetonitrile
N-[2-hydroxypiperazino]-N-nitroso-aminoacetonitrile
N-[2-chloro-4-methylpiperazino]-N-nitroso-aminoacetonitrile
N-[2-methyl-4-acetylpiperazino]-N-nitroso-aminoacetonitrile
N-[2-methoxypiperazino]-N-nitroso-aminoacetonitrile
N-[2-acetylpiperazino]-N-nitroso-aminoacetonitrile
N-[2-acetoxypiperazino]-N-nitroso-aminoacetonitrile
N-[2-β-hydroxyethylpiperazino]-N-nitroso-aminoacetonitrile
N-[2-methoxyethylpiperazino]-N-nitroso-aminoacetonitrile
N-[3-trifluoromethylpiperazino]-N-nitroso-aminoacetonitrile
N-[3-benzylpiperazino]-N-nitroso-aminoacetonitrile
N-[4-β-hydroxyethylpiperazino]-N-nitroso-aminoacetonitrile
N-[4-methoxyethylpiperazino]-N-nitroso-aminoacetonitrile
N-[4-trifluoromethylpiperazino]-N-nitroso-aminoacetonitrile
N-[4-benzylpiperazino]-N-nitroso-aminoacetonitrile or
N-[4-β-hydroxyethylpiperazino]-N-nitroso-α-methyl-aminoacetonitrile.

As indicated previously, the compounds of Formula I are useful because they possess pharmacological activity in animals. In particular, the compounds are useful as anti-anginal agents as indicated by an increase in coronary blood flow and by a reduction of myocardial oxygen consumption in an anesthetized dog given 20 milligrams per kilogram of body weight of a compound of Formula I intravenously.

For such usage, compound (I) may be administered orally or parenterally, preferably sublingually, as such or admixed with conventional pharmaceutical carriers. They may be administered orally in such forms as tablets, dispersible powders, granules, capsules, syrups, and elixirs, and parenterally as solutions, suspensions, dispersions, emulsions, and the like, e.g., a sterile injectable aqueous suspension. The compositions for oral use may contain one or more conventional adjuvants, such as sweetening agents, flavoring agents, coloring agents and preserving agents, in order provide an elegant and palatable preparation. Tablets may contain the active ingredient in admixture with conventional pharmaceutically acceptable excipients, e.g., inert diluents, such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and absorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g., calcium carbonate, calcium phosphate and kaolin. The injectable compositions are formulated as known in the art and may contain appropriate dispersing or wetting agents and suspending agents identical or similar to those mentioned above. These pharmaceutical preparations may contain up to about 90% of the active ingredient in combination with the carrier or adjuvant.

The anti-anginal effective dosage of active ingredient employed for the treatment of angina pectoris may vary depending on the particular compound employed and the severity of the condition being treated. However, in general, satisfactory results are obtained when the compounds (I) are administered at a daily dosage of from about 0.01 milligram to about 25 milligrams per kilogram of animal body weight, preferably given in divided doses two to four times a day, or in sustained release form. For most large mammals in need of said treatment, the total daily dosage is from about 0.7 to about 50 milligrams, preferably administered sublingually. Dosage forms suitable for internal use comprise from about 0.175 to about 25 milligrams of the active compound in intimate admixture with a solid or liquid pharmaceutically acceptable carrier or diluent.

The preferred pharmaceutical compositions from the standpoint of preparation and ease of administration are solid compositions, particularly hard-filled capsules and tablets containing about 1 to 25 milligrams of active ingredient.

EXAMPLE 1

Tablets

Tablets suitable for oral administration which contain the following ingredients may be prepared by conventional tabletting techniques. Such tablets are useful in treating angina pectoris at a dose of one tablet 2 to 4 times a day.

Ingredient: Weight (mg.)
- N-morpholino-N-nitroso-aminoacetonitrile — 10
- Tragacanth — 10
- Lactose — 237.5
- Corn starch — 25
- Talcum — 15
- Magnesium stearate — 2.5

EXAMPLE 2

Dry filled capsules

Capsules suitable for oral administration which contain the following ingredients are prepraed in a conventional manner. Such capsules are useful in treating angina pectoris at a dose of one caspule 2 to 4 times a day.

Ingredient: Weight (mg.)
- N-morpholino-N-nitroso-aminoacetonitrile — 10
- Inert solid diluent (starch, lactose, kaolin) — 290

EXAMPLES 3 AND 4

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitably administered 2 to 4 times per day for this purpose.

| Ingredients | Weight (mg.) Sterile injectable suspension | Weight (mg.) Oral liquid suspension |
| --- | --- | --- |
| N-morpholono-N-nitrosoaminoacetonitrile | 10 | 10 |
| Sodium carboxy methylcellulose U.S.P. | 1.25 | 12.5 |
| Methyl cellulose | 0.4 |  |
| Polyvinylpyrrolidone | 5 |  |
| Lecithin | 3 |  |
| Benzyl alcohol | 0.01 |  |
| Magnesium aluminum silicate |  | 47.5 |
| Flavor |  | Q.s. |
| Color |  | Q.s. |
| Methyl paraben, U.S.P. |  | 4.5 |
| Propyl paraben, U.S.P. |  | 1.0 |
| Polysorbate 80 (e.g. Tween 80) U.S.P. |  | 5 |
| Sorbital solutuion, 70% U.S.P. |  | 2,500 |
| Buffer agent to adjust pH for desired stability | Q.s. | Q.s. |
| Water | (1) | (2) |

1 For injection, q.s. to 1 ml.
2 Q.s. to 5 ml.

EXAMPLES 5 AND 6

Tablets and capsules suitable for oral administration

Tablets and capsules containing the ingredients indicated below may be prepared by conventional techniques and are useful in treating agina pectoris at a dose of one tablet or capsule 2 to 4 times a day.

| Ingredient | Weight (mg.) Tablet | Weight (mg.) Capsule |
| --- | --- | --- |
| N-(2-chloromorpholino)-N-nitroso-aminoacetonitrile | 10 | 10 |
| Tragacanth | 10 |  |
| Lactose | 237.5 | 290 |
| Corn starch | 25 |  |
| Talcum | 15 |  |
| Magnesium stearate | 2.5 |  |
| Total | 300 | 300 |

Similarly, tablets and capsules are prepared using

N-(2-hydroxymorpholino)-N-nitroso-aminoacetonitrile;
N-(2-methylmorpholino)-N-nitroso-aminoacetonitrile;
N-(2-methoxymorpholino)-N-nitroso-aminoacetonitrile;
N-(2-acetylmorpholino)-N-nitroso-aminoacetonitrile; or
N-(2-actoxymorpholino)-N-nitroso-aminoacetonitrile in place of the N-(2-chloromorpholino)-N-nitroso-aminoacetonitrile above and are used as above in treating angina pectoris.

EXAMPLES 7 AND 8

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of angina pectris. The injectable suspension is suitable for administration once or twice a day whereas the oral liquid suspension is suitably administered 2 to 4 times per day for this purpose.

| Ingredients | Weight (mg.) | |
|---|---|---|
| | Sterile injectable suspension | Oral liquid suspension |
| N-(2-hydroxymorpholino)-N-nitrosoaminoacetonitrile | 10 | 10 |
| Sodium carboxy methyl cellulose U.S.P. | 1.25 | 12.5 |
| Methyl cellulose | 0.4 | |
| Polyvinylpyrrolidone | 5 | |
| Lecithin | 3 | |
| Benzyl alcohol | 0.01 | 47.5 |
| Flavor | | Q.s. |
| Color | | Q.s. |
| Methyl paraben, U.S.P. | | 4.5 |
| Propyl paragen, U.S.P. | | 1.0 |
| Polysorbate 80 (e.g. Tween 80), U.S.P. | | 5 |
| Sorbitol solution, 70%, U.S.P. | | 2,500 |
| Buffer agent to adjust pH for desired stability | Q.s. | Q.s. |
| Water | (1) | (2) |

1 For injection, q.s. to 1 ml.
2 Q.s. to 5 ml.

Injectable suspension and oral liquid suspensions are similarly prepared using

N-(2-chloromorpholino)-N1nitroso-aminoacetonitrile;
N-(2-methylmorpholino)-N-nitroso-aminoacetonitrile;
N-(3-β-hydroxymethylmorpholino)-N-nitroso-aminoacetonitrile;
N-(3-methoxymethylmorpholino)-N-nitroso-aminoacetonitrile;
N-(3-trifluoromethylmorpholino)-N-nitroso-aminoacetonitrile; or
N-(3-benzylmorpholino)-N-nitroso-aminoacetonitrile in place of the N-(2-hydroxymorpholino)-N-nitroso-aminoacetonitrile above and are used as above in treating angina pectoris.

EXAMPLES 9 AND 10

Tablets and capsules suitable for oral administration

Tablets and capsules containing the ingredients indicated below may be prepared by conventional techniques and are useful in treating angina pectoris at a dose of one tablet or capsule 2 to 4 times a day.

| Ingredient | Weight (mg.) | |
|---|---|---|
| | Tablet | Capsule |
| N-diallylamino-N-nitroso-aminoacetonitrile | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 |

Tablets and capsules are similarly prepared using

N-dimethylamino-N-nitroso-aminoacetonitrile;
N-diallylamino-N-nitroso-α-phenethyl-aminoacetonitrile;
N-diallylamino-N-nitroso-α-methyl-aminoacetonitrile;
N-methylpropylamino-N-nitroso-aminoacetonitrile;
N-(N-allyl-p-hydroxymethylamino)-N-nitroso-aminoacetonitrile; or
N-methylcyclohexylamino-N-nitroso-aminoacetonitrile in place of the N-N-diallylamino-N-nitroso-aminoacetonitrile above and are used as above in treating angina pectoris.

EXAMPLES 11 AND 12

Tablets and capsules suitable for oral administration

Tablets and capsules containing the ingredients indicated below may be prepared by conventional techniques and are useful in treating angina pectoris at a dose of one tablet or capsule 2 to 4 times a day.

| Ingredient | Weight (mg.) | |
|---|---|---|
| | Tablet | Capsule |
| N-methylphenylamino-N-nitroso-aminoacetonitrile | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 |

Similarly tablets and capsules are prepared using

N-methylphenethylamino-N-nitroso-aminoacetonitrile;
N-dibenzylamino-N-nitroso-aminoacetonitrile;
N-(N-methyl-p-hydroxyphenylamino)-N-nitroso-aminoacetonitrile;
N-(N-propyl-p-chlorophenylamino)-N-nitroso-aminoacetonitrile;
N-(N-methyl-p-cyanophenylamino)-N-nitroso-aminoacetonitrile;
N-(N-ethyl-o-trifluoromethylphenylamino)-N-nitroso-aminoacetonitrile;
N-(N-methyl-o-methoxyphenylamino)-N-nitroso-aminoacetonitrile; or
N-(N-methyl-o-toluidino)-N-nitroso-aminoacetonitrile in place of the N-methylphenylamino-N-nitroso-aminoacetonitrile above and are used as above in treating angina pectoris.

EXAMPLES 13 AND 14

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitably administered 2 to 4 times per day for this purpose.

and are useful in treating angina pectoris at a dose of one tablet or capsule 2 to 3 times a day.

| Ingredient | Weight (mg.) Tablet | Weight (mg.) Capsule |
|---|---|---|
| N-piperidino-N-nitroso-aminoacetonitrile | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 |

Similarly, tablets and capsules are prepared using N-piperidino-N-nitroso-α-methyl-aminoacetonitrile;

| Ingredients | Weight (mg.) Sterile injectable suspension | Weight (mg.) Oral liquid suspension |
|---|---|---|
| N-(N-methyl-o-toluidino)-N-nitroso-aminoacetonitrile | 10 | 10 |
| Sodium carboxy methyl cellulose U.S.P | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70%, U.S.P | | 2,500 |
| Buffer agent to adjust pH for desired stability | Q.s. | Q.s. |
| Water | (1) | (2) |

[1] For injection, Q.s. to 1 ml.
[2] Q.s. to 5 ml.

Sterile injectable suspensions and oral liquid suspensions are similarly prepared using N-(N-methyl-1-acetoxyphenylamino)-N-nitroso-aminoacetonitrile;
N-(N-methyl-p-acetylphenylamino)-N-nitroso-aminoacetonitrile;
N-(n-methyl-o-[β-hydroxyethyl]phenylamino-N-nitroso-aminoacetonitrile;
N-(N-methyl-p-dimethylaminophenylamino)-N-nitroso-aminoacetonitrile;
N-(N-methyl-3,4-dimethyleneoxyphenylamino)-N-nitroso-aminoacetonitrile; or
N-(N-methyl-3,4-methylenedioxybenzylamino)-N-nitroso-aminoacetonitrile in place of the N - (N-methyl-o-toluidino) - N - nitroso-aminoacetonitrile above and are used as above in treating angina pectoris.

EXAMPLES 15 AND 16

Tablets and capsules suitable for oral administration

Tablets and capsules containing the ingredients indicated below may be prepared by conventional techniques N-hexyleneimino-N-nitroso-aminoacetonitrile;
N-(4-hydroxypiperidino)-N-nitroso-aminoacetonitrile;
N-(2,4-dichloropiperidino)-N-nitroso-aminoacetonitrile;
N-(4-methylpiperidino)-N-nitroso-aminoacetonitrile;
N-(4-methoxypiperidino))-N-nitroso-aminoacetonitrile;
N-(4-acetylpiperidino)-N-nitroso-aminoacetonitrile; or
N-(4-acetoxypiperidino)-N-nitroso-aminoacetonitrile, in place of the N-piperazino-N-nitroso-aminoacetonitrile above and are used as above in treating angina pectoris.

EXAMPLES 17 and 18

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitably administered 2 to 4 times per day for this purpose.

| Ingredients | Weight (mg.) Sterile injectable suspension | Weight (mg.) Oral liquid suspension |
|---|---|---|
| N-(4-[β-hydroxyethyl]piperazino)-N-nitroso aminoacetonitrile | 10 | 10 |
| Sodium carboxy methyl cellulose U.S.P | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.S. |
| Color | | Q.S. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70%, U.S.P | | 2,500 |
| Buffer agent to adjust pH for desired stability | Q.S. | Q.S. |
| Water | (1) | (2) |

[1] For injection q.s. to 1 ml.
[2] Q.s. to 5 ml.

Sterile injectable suspensions and oral liquid suspensions similarly are prepared using N-(4-[β-hydroxyethyl]piperidino)-N-nitroso-α-methyl aminoacetonitrile;
N-(4-methoxyethylpiperidino)-N-nitroso-aminoacetonitrile;
N-(4-trifluoromethylpiperidino)-N-nitroso-aminoacetonitrile;
N-(2-benzylpiperidino)-N-nitroso-aminoacetonitrile; or
N-(2-phenylpiperidino)-N-nitrosoaminoacetonitrile in place of N-isoquinolino-N-nitroso-aminoacetonitrile above and are used as above in treating angina pectoris.

EXAMPLES 21 AND 22

Tablets and capsules suitable for oral administration

Tablets and capsules containing the ingredients indicated below may be prepared by conventional techniques and are useful in treating angina pectoris at a dose of one tablet or capsule 2 to 4 times a day.

| Ingredient | Weight (mg.) Tablet | Weight (mg.) Capsule |
|---|---|---|
| N-(1-β-hydroxyethylisoquinolino)-N-nitrosoaminoacetonitrile | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 | in place of the N-(4-[β-hydroxyethyl]piperazino)-N-nitrosoaminoacetonitrile above and are used as above in treating angina pectoris.

EXAMPLES 19 and 20

Sterile suspension for injection and oral liquid suspension

The following pharmaceutical compositions are formulated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitably administered 2 to 4 times per day for this purpose.

Similarly tablets and capsules are prepared using

N-(1-acetoxyisoquinolino)-N-nitroso-aminoacetonitrile;
N-(1-methoxyethylisoquinolino)-N-nitroso-aminoacetonitrile;
N-(4-trifluoromethylisoquinolino)-N-nitroso-aminoacetonitrile; or
N-(1-benzylisoquinolino)-N-nitroso-aminoacetonitrile as the active ingredient in place of the N-(1-β-hydroxyethylisoquinolino)-N-nitroso-aminoacetonitrile above and are used as above in treating angina pectoris.

EXAMPLES 23 AND 24

Sterile suspension for injection and oral liquid suspension

The following pharmaceutical compositions are formu-

| Ingredients | Weight (mg.) Sterile injectable suspension | Weight (mg.) Oral liquid suspension |
|---|---|---|
| N-iosquinolinc-N-nitroso-aminoacetonitrile | 10 | 10 |
| Sodium carboxy methyl cellulose U.S.P | 1.25 | 12.5 |
| Methyl cellulose | 0.4 | |
| Polyvinylpyrrolidone | 5 | |
| Lecitnih | 3 | |
| Benzyl alcohol | 0.01 | |
| Magnesium aluminum silicate | | 47.5 |
| Flavor | | Q.s. |
| Color | | Q.s. |
| Methyl paraben, U.S.P | | 4.5 |
| Propyl paraben, U.S.P | | 1.0 |
| Polysorbate 80 (e.g. Tween 80), U.S.P | | 5 |
| Sorbitol solution, 70%, U.S.P | | 2,500 |
| Buffer agent to adjust pH for desired stability | Q.s. | Q.s. |
| Water | (¹) | (²) |

¹ For injection, q.s. to 1 ml.
² Q.s. to 5 ml.

Sterile injectable suspensions and oral liquid suspensions similarly are prepared using N-(1-hydroxyisoquinolino)-N-nitroso-aminoacetonitrile;
N-(1-chloroisoquinolin)-N-nitroso-aminoacetonitrile;
N-(1-methylisoquinolino)-N-nitroso-aminoacetonitrile;
N-(1-methoxyisoquinolino)-N-nitroso-aminoacetonitrile; or
N-(1-acetylisoquinolino)-N-nitroso-aminoacetonitrile lated with the indicated amount of active agent using conventional techniques. The injectable suspension and the oral liquid suspension represent formulations useful as unit doses and may be administered in the treatment of angina pectoris. The injectable suspension is suitable for administration once a day whereas the oral liquid suspension is suitable administered 2 to 4 times per day for this purpose.

| Ingredients | Weight (mg.) Sterile injectable suspension | Weight (mg.) Oral liquid suspension |
|---|---|---|
| N-piperazino-N-nitroso-aminoacetonitrile | 10 | 10 |
| Sodium carboxy methyl cellulose U.S.P. | 1.25 | 12.5 |
| Methyl cellulose | 0.4 | |
| Polyvinylpyrrolidone | 5 | |
| Lecithin | 3 | |
| Benzyl alcohol | 0.01 | |
| Magnesium aluminum silicate | | 47.5 |
| Flavor | | Q.s. |
| Color | | Q.s. |
| Methyl paraben, U.S.P. | | 4.5 |
| Propyl paraben, U.S.P. | | 1.0 |
| Polysorbate 80 (e.g. Tween 80), U.S.P. | | 5 |
| Sorbitol solution, 70%, U.S.P. | | 2,500 |
| Buffer agent to adjust pH for desired stability | Q.s. | Q.s. |
| Water | (¹) | (²) |

¹ For injection, Q.s. to 1 ml.
² Q.s. to 5 ml.

Sterile injectable suspensions and oral liquid suspensions are similarly prepared using N-(2-hydroxypiperazino)-N-nitroso-aminoacetonitrile;
N-(2-chloro-4-methylpiperazino)-N-nitroso-aminoacetonitrile;
N-(2-methyl-4-acetylpiperazino)-N-nitroso-aminoacetonitrile;
N-(2-methoxypiperazino)-N-nitroso-aminoacetonitrile;
N-(2-acetylpiperazino)-N-nitroso-aminoacetonitrile;
N-(2-acetoxypiperazino)-N-nitroso-aminoacetonitrile;
N-(2-β-hydroxyethylpiperazino)-N-nitroso-aminoacetonitrile;
N-(2-methoxyethylpiperazino)-N-nitroso-aminoacetonitrile; or
N-(3-trifluoromethylpiperazino)-N-nitroso-aminoacetonitrile as the active agent in place of N-piperazino-N-nitroso-aminoacetonitrile above and are used as above in treating angina pectoris.

EXAMPLES 25 AND 26

Tablets and capsules suitable for oral administration

Tablets and capsules containing the ingredients indicated below may be prepared by conventional techniques and are useful in treating angina pectoris at a dose of one tablet or capsule 2 to 4 times a day.

| Ingredient | Weight (mg.) Tablet | Weight (mg.) Capsule |
|---|---|---|
| N-(4-β-hydroxyethylpiperazino)-N-nitroso-aminoacetonitrile | 10 | 10 |
| Tragacanth | 10 | |
| Lactose | 237.5 | 290 |
| Corn starch | 25 | |
| Talcum | 15 | |
| Magnesium stearate | 2.5 | |
| Total | 300 | 300 |

Similarly, tablets and capsules are prepared using

N-(3-benzylpiperazino)-N-nitroso-aminoacetonitrile;
N-(4-methoxyethylpiperazino)-nitroso-aminoacetonitrile;
N-(4-trifluoromethylpiperazino)-N-nitroso-aminoacetonitrile;
N-(4-benzylpiperazino)-N-nitroso-aminoacetonitrile; or
N-(4-β-hydroxyethylpiperazino)-N-nitroso-α-methyl-aminoacetonitrile;
N-(4-β-hydroxyethylpiperazino)-N-nitroso-α-phenyl-aminoacetonitrile in place of the N-(4-β-hydroxyethylpiperazino)-N-nitroso-aminoacetonitrile above and are used as above in treating angina pectoris.

EXAMPLE 27

A tablet suitable for the preferred sublingual mode of administration may contain the following ingredients and may be prepared by conventional tabletting techniques. Such tablets are useful in treating angina pectoris and are taken sublingually as the need arises.

| Ingredient: | Weight (mg.) |
|---|---|
| N-morpholino-N-nitroso-aminoacetonitrile | 10 |
| Mannitol | 43.5 |
| Lactose | 43.5 |
| Polyvinyl pyrolidine | 2.0 |
| Magnesium stearate | 1.0 |

Similarly, tablets useful in the treatment of angina pectoris which may be administered sublingually are prepared using N-diallylamino-N-nitroso-aminoacetonitrile;
N-methylphenylamino-N-nitroso-aminoacetonitrile;
N-piperidino-N-nitroso-aminoacetonitrile;
N-isoquinolino-N-nitroso-aminoacetonitrile;
N-(4-β-hydroxyethylpiperazino)-N-nitroso-aminoacetonitrile; or
N-(4-β-hydroxyethylpiperazino)-N-nitroso-α-methyl-aminoacetonitrile in place of the N-morpholino-N-nitroso-aminoacetonitrile above.

What is claimed is:

1. A method for treating angina pectoris which comprises orally or parenterally administering to a mammal in need of said treatment an anti-anginal effective amount of a compound of the formula

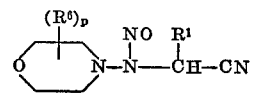

where
$R^1$ represents hydrogen, lower alkyl or

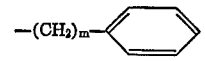

and
$R^6$ represents hydroxy; halo having an atomic weight of about 19 to 36; lower alkyl; lower alkoxy; alkanoyl having 2 to 4 carbon atoms; alkanoyloxy having 2 to 4 carbon atoms; ω-hydroxy lower alkyl; alkoxy alkyl alkyl having 2 to 4 carbon atoms; lower alkyl having 1 to 4 carbon atoms substituted with 1 to 4 halogen atoms having an atomic weight between about 19 to 36; or

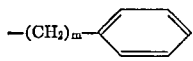

where
 m is 0, 1 or 2; and
 p is 0, 1 or 2.

2. A method according to claim 1 in which the compound is N-morpholino-N-nitroso-aminoacetonitrile.

3. A method according to claim 1 wherein the compound is administered to a mammal in need of said treatment at a daily dose of from about 0.7 molligram to about 50 milligrams.

4. A method according to claim 1 wherein the compound is administered to a mammal in need of said treatment in a unit dosage form comprising said compound to the extent of from about 0.175 milligrams to about 25 milligrams per unit dosage.

5. A tablet suitable for sublingual administration useful for treating angina pectoris comprising as an active ingredient thereof an anti-angial effective amount of a compound of the formula

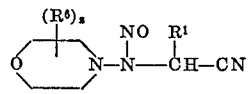

where
R$^1$ represents hydrogen, lower alkyl or

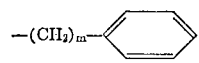

and
R$^6$ represents hydroxy; halo having an atomic weight of about 19 to 36; lower alkyl; lower alkoxy; alkanoyl having 2 to 4 carbon atoms; alkanoyloxy having 2 to 4 carbon atoms; ω-hydroxy lower alkyl; alkoxyalkyl having 2 to 4 carbon atoms; lower alkyl having 1 to 4 carbon atoms substituted with 1 to 4 halogen atoms having an atomic weight between about 19 to 36; or

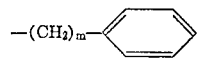

where
 m is 0, 1 or 2; and
 p is 0, 1 or 2
in combination with solid pharmaceutically acceptable excipients.

6. A tablet according to claim 5 in which the active ingredient is N-morpholino-N-nitroso-aminoacetonitrile.

References Cited

Derwent Farmdoc No. 30,749, Neth. Pat. No. 6710945, pp. 497–505, published Feb. 12, 1968.

JEROME D. GOLDBERG, Primary Examiner